(12) United States Patent
Hsu et al.

(10) Patent No.: US 10,081,513 B2
(45) Date of Patent: Sep. 25, 2018

(54) MOTION PROFILE FOR EMPTY ELEVATOR CARS AND OCCUPIED ELEVATOR CARS

(71) Applicant: Otis Elevator Company, Farmington, CT (US)

(72) Inventors: Arthur Hsu, South Glastonbury, CT (US); David Ginsberg, Granby, CT (US); Jose Miguel Pasini, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 62 days.

(21) Appl. No.: 15/374,343

(22) Filed: Dec. 9, 2016

(65) Prior Publication Data

US 2018/0162684 A1    Jun. 14, 2018

(51) Int. Cl.
| | | |
|---|---|---|
| *B66B 1/30* | (2006.01) | |
| *B66B 11/04* | (2006.01) | |
| *B66B 9/00* | (2006.01) | |
| *B66B 1/24* | (2006.01) | |
| *B66B 5/00* | (2006.01) | |

(52) U.S. Cl.
CPC .............. *B66B 1/30* (2013.01); *B66B 1/2491* (2013.01); *B66B 5/0012* (2013.01); *B66B 9/003* (2013.01); *B66B 11/0407* (2013.01)

(58) Field of Classification Search
CPC ....... B66B 1/30; B66B 1/2491; B66B 1/2408; B66B 1/2416
USPC ......................................................... 187/247
See application file for complete search history.

(56) References Cited

U.S. PATENT DOCUMENTS

| | | | | |
|---|---|---|---|---|
| 1,939,729 | A * | 12/1933 | Stark ......................... | B66B 9/00 187/249 |
| 1,943,119 | A * | 1/1934 | James ....................... | B66B 9/10 198/322 |
| 4,004,654 | A * | 1/1977 | Hamy ..................... | B66B 9/003 104/127 |
| 4,821,845 | A * | 4/1989 | DeViaris ................. | B66B 7/021 104/307 |
| 5,601,156 | A * | 2/1997 | McCarthy ................ | B66B 9/00 187/249 |
| 5,651,426 | A * | 7/1997 | Bittar .................... | B66B 1/2458 187/249 |
| 5,663,538 | A | 9/1997 | Sakita | |

(Continued)

FOREIGN PATENT DOCUMENTS

| | | |
|---|---|---|
| CN | 104340783 A | 2/2015 |
| JP | 3029168 B2 | 4/2000 |

(Continued)

*Primary Examiner* — David Warren
(74) *Attorney, Agent, or Firm* — Cantor Colburn LLP

(57) ABSTRACT

A method of operating an elevator system is provided. The method comprising: detecting an occupancy status of the elevator car, the occupancy status comprising at least one of occupied and unoccupied; selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and moving the elevator car in accordance with the motion profile selected.

20 Claims, 3 Drawing Sheets

(56) References Cited

U.S. PATENT DOCUMENTS

| | | | | |
|---|---|---|---|---|
| 5,752,585 | A * | 5/1998 | Bittar | B66B 1/2458 |
| | | | | 187/249 |
| 5,758,748 | A * | 6/1998 | Barker | B66B 9/00 |
| | | | | 187/249 |
| 5,861,586 | A * | 1/1999 | McCarthy | B61B 15/00 |
| | | | | 187/249 |
| 5,924,524 | A * | 7/1999 | Barker | B66B 1/2458 |
| | | | | 182/12 |
| 6,364,065 | B1 | 4/2002 | Hikita | |
| 8,136,635 | B2 | 3/2012 | Christy et al. | |
| 8,292,038 | B2 | 10/2012 | McCarthy et al. | |
| 8,297,409 | B2 | 10/2012 | Hsu et al. | |
| 8,424,651 | B2 | 4/2013 | Brand | |
| 8,434,599 | B2 | 5/2013 | Wang et al. | |
| 9,010,499 | B2 | 4/2015 | McCarthy et al. | |
| 9,394,139 | B2 | 7/2016 | Kugiya et al. | |
| 9,598,265 | B1 * | 3/2017 | Jacobs | B66B 9/003 |
| 2003/0217893 | A1 * | 11/2003 | Dunser | B66B 1/2466 |
| | | | | 187/249 |
| 2005/0189181 | A1 * | 9/2005 | Meyle | B66B 1/2458 |
| | | | | 187/382 |
| 2006/0163008 | A1 * | 7/2006 | Godwin | B66B 9/00 |
| | | | | 187/288 |
| 2008/0006485 | A1 | 1/2008 | Kocher et al. | |
| 2010/0078266 | A1 | 4/2010 | Choi | |
| 2016/0075533 | A1 * | 3/2016 | Scomparin | B66B 9/003 |
| | | | | 187/240 |
| 2016/0292522 | A1 * | 10/2016 | Chen | B66B 1/3476 |
| 2016/0295192 | A1 * | 10/2016 | Hsu | B66B 1/2408 |
| 2016/0295196 | A1 * | 10/2016 | Finn | G06T 7/11 |
| 2016/0304316 | A1 * | 10/2016 | Witczak | B66B 11/0407 |
| 2016/0304317 | A1 * | 10/2016 | Witczak | B66B 11/04 |
| 2016/0347577 | A1 * | 12/2016 | Simcik | B66B 1/3407 |
| 2017/0001829 | A1 * | 1/2017 | Jetter | B66B 1/2433 |
| 2017/0008729 | A1 * | 1/2017 | Ginsberg | B66B 1/28 |
| 2017/0015524 | A1 * | 1/2017 | Fargo | B66B 9/003 |
| 2017/0057780 | A1 * | 3/2017 | Nguyen | H04W 4/70 |
| 2017/0057784 | A1 * | 3/2017 | Witczak | B66B 7/02 |
| 2017/0057786 | A1 * | 3/2017 | Witczak | B66B 7/046 |
| 2017/0057790 | A1 * | 3/2017 | Roberts | B66B 11/0273 |
| 2017/0057792 | A1 * | 3/2017 | Dwari | B66B 11/0407 |
| 2017/0066623 | A1 * | 3/2017 | Kuczek | B66B 1/28 |
| 2017/0073183 | A1 * | 3/2017 | Ginsberg | B66B 5/06 |
| 2017/0088395 | A1 * | 3/2017 | Roberts | B66B 1/2491 |
| 2017/0088396 | A1 * | 3/2017 | Fargo | B66B 1/32 |
| 2017/0088398 | A1 * | 3/2017 | Kuczek | B66B 5/044 |
| 2017/0158461 | A1 * | 6/2017 | Roberts | B66B 1/30 |
| 2017/0190544 | A1 * | 7/2017 | Witczak | B66B 1/2466 |
| 2017/0233218 | A1 * | 8/2017 | Zheng | B66B 1/2491 |
| | | | | 187/247 |
| 2017/0240385 | A1 * | 8/2017 | Fargo | B66B 11/0446 |

FOREIGN PATENT DOCUMENTS

| | | |
|---|---|---|
| JP | 4086565 B2 | 5/2008 |
| JP | 2013170040 A | 9/2013 |
| WO | 2016116146 A1 | 7/2016 |

* cited by examiner

MOTION PROFILE FOR EMPTY ELEVATOR CARS AND OCCUPIED ELEVATOR CARS

BACKGROUND

The subject matter disclosed herein generally relates to the field of elevators, and more particularly to an apparatus and method operating an elevator car.

In order to ensure passenger comfort elevator systems commonly place limits on many motion parameters of an elevator car including but not limited to speed, acceleration, and jerk.

BRIEF SUMMARY

According to one embodiment, a method of operating an elevator system is provided. The method comprising: detecting an occupancy status of the elevator car, the occupancy status comprising at least one of occupied and unoccupied; selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and moving the elevator car in accordance with the motion profile selected.

In addition to one or more of the features described above, or as an alternative, further embodiments of the method may include that the unoccupied motion profile allows the elevator car to operate using a motion parameter having a greater magnitude than a comparable motion parameter of the occupied motion profile.

In addition to one or more of the features described above, or as an alternative, further embodiments of the method may include: detecting a direction of travel of an elevator car; wherein the occupied lateral movement motion profile allows the elevator car to operate using a motion parameter having a smaller magnitude than a comparable motion parameter of the occupied motion profile.

In addition to one or more of the features described above, or as an alternative, further embodiments of the method may include: detecting a direction of travel of an elevator car; wherein the occupied descent motion profile allows the elevator car to operate using a motion parameter having a smaller magnitude than a comparable motion parameter of the occupied motion profile.

In addition to one or more of the features described above, or as an alternative, further embodiments of the method may include that the power-save motion profile allows the elevator car to operate using a motion parameter having a smaller magnitude than a comparable motion parameter of the occupied motion profile.

In addition to one or more of the features described above, or as an alternative, further embodiments of the method may include that the motion parameters include at least one of a speed of the elevator car, an acceleration of the elevator car, and a jerk of the elevator car.

In addition to one or more of the features described above, or as an alternative, further embodiments of the method may include that the elevator system is a ropeless multi-car elevator system.

In addition to one or more of the features described above, or as an alternative, further embodiments of the method may include that the elevator system detects that the occupancy status using at least one of a visual detection device, a weight detection device, a laser detection device, a thermal image detection device, a depth detection device, a motion detection device, an odor detection device, a RADAR device, an ultrasonic sensor, and a pyroelectric sensor.

In addition to one or more of the features described above, or as an alternative, further embodiments of the method may include that the occupancy status is continuously detected and updated throughout the movement of the elevator car.

According to another embodiment, an elevator system is provided. The elevator system comprising: a processor; a memory comprising computer-executable instructions that, when executed by the processor, cause the processor to perform operations. The operations comprising: detecting an occupancy status of the elevator car, the occupancy status comprising at least one of occupied and unoccupied; selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and moving the elevator car in accordance with the motion profile selected.

In addition to one or more of the features described above, or as an alternative, further embodiments of the elevator system may include that the unoccupied motion profile allows the elevator car to operate using a motion parameter having a greater magnitude than a comparable motion parameter of the occupied motion profile.

In addition to one or more of the features described above, or as an alternative, further embodiments of the elevator system may include that the operations further comprise: detecting a direction of travel of an elevator car; wherein the occupied lateral movement motion profile allows the elevator car to operate using a motion parameter having a smaller magnitude than a comparable motion parameter of the occupied motion profile.

In addition to one or more of the features described above, or as an alternative, further embodiments of the elevator system may include that the operations further comprise: detecting a direction of travel of an elevator car; wherein the occupied descent motion profile allows the elevator car to operate using a motion parameter having a smaller magnitude than a comparable motion parameter of the occupied motion profile.

In addition to one or more of the features described above, or as an alternative, further embodiments of the elevator system may include that the power-save motion profile allows the elevator car to operate using a motion parameter having a smaller magnitude than a comparable motion parameter of the occupied motion profile.

In addition to one or more of the features described above, or as an alternative, further embodiments of the elevator system may include that the motion parameters include at least one of a speed of the elevator car, an acceleration of the elevator car, and a jerk of the elevator car.

In addition to one or more of the features described above, or as an alternative, further embodiments of the elevator system may include that the elevator system is a ropeless multi-car elevator system.

In addition to one or more of the features described above, or as an alternative, further embodiments of the elevator system may include that the elevator system detects that the occupancy status using at least one of a visual detection device, a weight detection device, a laser detection device, a thermal image detection device, a depth detection device, a motion detection device, an odor detection device, a RADAR device, an ultrasonic sensor, and a pyroelectric sensor.

In addition to one or more of the features described above, or as an alternative, further embodiments of the elevator system may include that the occupancy status is continuously detected and updated throughout the movement of the elevator car.

According to another embodiment, a computer program product tangibly embodied on a computer readable medium is provided. The computer program product including instructions that, when executed by a processor, cause the processor to perform operations comprising: detecting an occupancy status of the elevator car, the occupancy status comprising at least one of occupied and unoccupied; selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and moving the elevator car in accordance with the motion profile selected.

In addition to one or more of the features described above, or as an alternative, further embodiments of the computer program may include that the unoccupied motion profile allows the elevator car to operate using a motion parameter having a greater magnitude than a comparable motion parameter of the occupied motion profile.

Technical effects of embodiments of the present disclosure include adjusting the motion profile of an elevator car when the elevator car is empty so that the elevator car could reach a destination faster.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
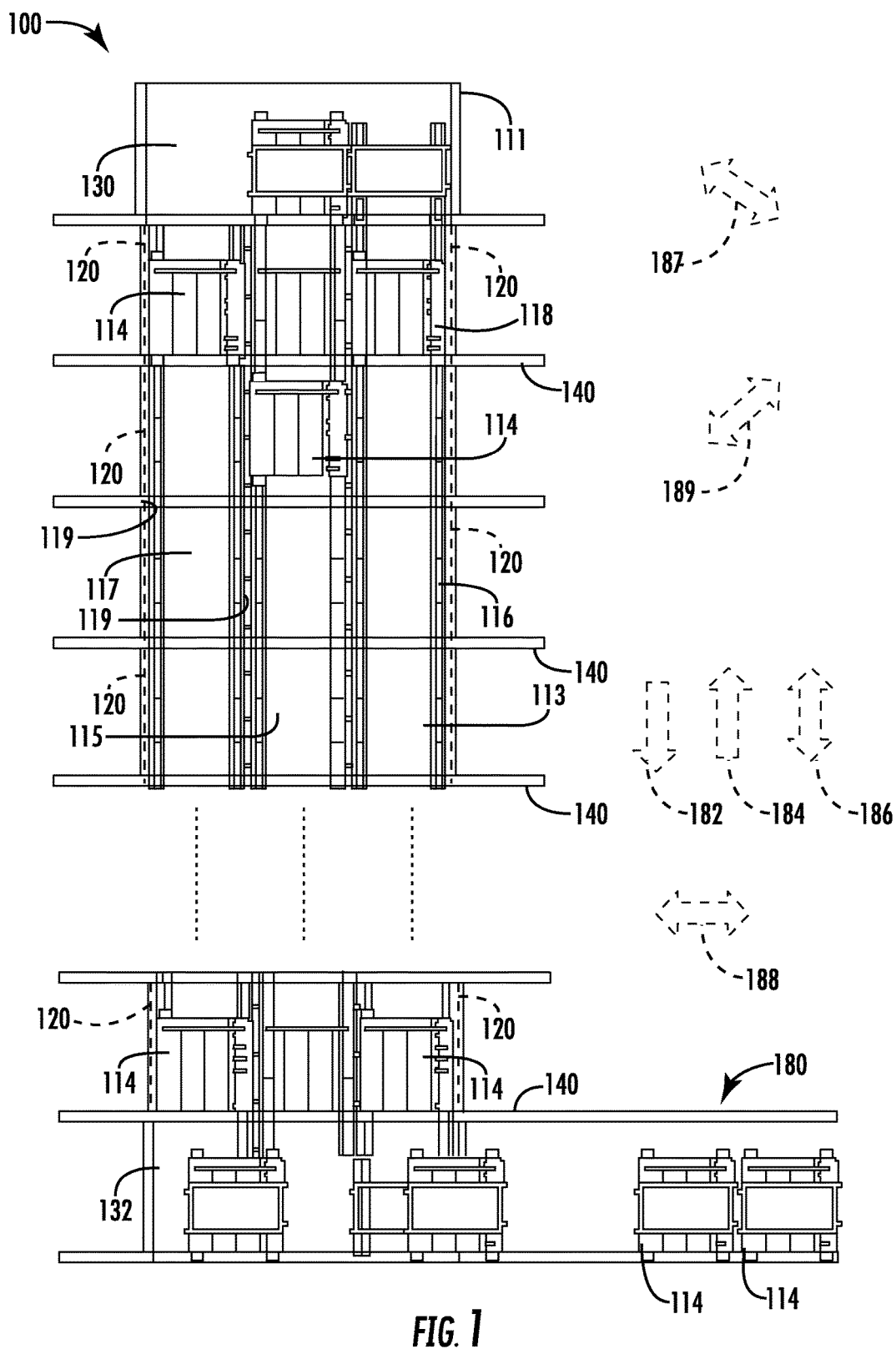
FIG. 1 illustrates a schematic view of a multicar elevator system, in accordance with an embodiment of the disclosure.

FIG. 1 depicts a multicar, ropeless elevator system 100 that may be employed with embodiments of the present disclosure. As will be appreciated by those of skill in the art, FIG. 1 depicts a multicar, ropeless elevator system 100, however the embodiments disclosed herein may be incorporated with other elevator systems that are not multicar, ropeless elevator systems or that include any other known elevator configuration. In addition, an elevator car 114 of the elevator system 100 may include two or more compartments (ex: double deck elevator). As seen in FIG. 1, the elevator system 100 includes an elevator shaft 111 having a plurality of lanes 113, 115 and 117. While three lanes 113, 115, 117 are shown in FIG. 1, it is understood that various embodiments of the present disclosure and various configurations of a multicar, ropeless elevator system may include any number of lanes, either more or fewer than the three lanes shown in FIG. 1. In each lane 113, 115, 117, multiple elevator cars 114 can travel in one direction, i.e., up as shown by arrow 184 or down as shown by arrow 182, or multiple cars within a single lane may be configured to move in opposite directions, as shown by arrow 186. For example, in FIG. 1 elevator cars 114 in lanes 113 and 115 travel up in the direction of arrow 184 and elevator cars 114 in lane 117 travel down in the direction of arrow 182. Further, as shown in FIG. 1, one or more elevator cars 114 may travel in a single lane 113, 115, and 117. Elevator systems can be operated with the same motion parameter limits regardless of whether a passenger is detected in the elevator car, which may lead to inefficient use of the elevator system.

As shown, above the top accessible floor of the building is an upper transfer station 130 configured to impart lateral motion in the direction of arrow 188 to the elevator cars 114 to move the elevator cars 114 between lanes 113, 115, and 117. Lateral motion may include any motion in the lateral direction, such as, for example, horizontal lateral motion as shown by arrow 188 and diagonal lateral motion as shown by arrow 189 and arrow 187. Lateral motion may be undertaken by the elevator car 114 without a transfer station, such as, for example an elevator system serving pyramid shaped buildings. It is understood that upper transfer station 130 may be located at the top floor, rather than above the top floor. Similarly, below the first floor of the building is a lower transfer station 132 configured to impart lateral motion to the elevator cars 114 to move the elevator cars 114 between lanes 113, 115, and 117. It is understood that lower transfer station 132 may be located on the first floor, rather than below the first floor. Although not shown in FIG. 1, one or more intermediate transfer stations may be configured between the lower transfer station 132 and the upper transfer station 130. Intermediate transfer stations are similar to the upper transfer station 130 and lower transfer station 132 and are configured to impart lateral motion to the elevator cars 114 at the respective transfer station, thus enabling transfer from one lane to another lane at an intermediary point within the elevator shaft 111. Further, although not shown in FIG. 1, the elevator cars 114 are configured to stop at a plurality of floors 140 to allow ingress to and egress from the elevator cars 114.

In the illustrated embodiment the elevator system 100 includes a designated parking area 180. The designated parking area 180 may be used to store elevator cars 114 when not in use. As shown in FIG. 1, the designated parking area 180 may be located below the first floor of the building, however it is understood that the designated parking area 180 may be located on any other floor of the building or also above the top floor of the building. If an elevator system 100 does not include a designated parking area 180 then one of the lanes 113, 115, or 117 may be shut off to elevator car traffic and used to store the elevators cars 114.

Elevator cars 114 are propelled within lanes 113, 115, 117 using a propulsion system such as a linear, permanent magnet motor system having a primary, fixed portion, or first part 116, and a secondary, moving portion, or second part 118. The first part 116 is a fixed part because it is mounted to a portion of the lane, and the second part 118 is a moving part because it is mounted on the elevator car 114 that is movable within the lane.

The first part 116 includes windings or coils mounted on a structural member 119, and may be mounted at one or both sides of the lanes 113, 115, and 117, relative to the elevator cars 114.

The second part 118 includes permanent magnets mounted to one or both sides of cars 114, i.e., on the same sides as the first part 116. The second part 118 engages with the first part 116 to support and drive the elevators cars 114 within the lanes 113, 115, 117. First part 116 is supplied with drive signals from one or more drive units 120 to control movement of elevator cars 114 in their respective lanes through the linear, permanent magnet motor system. The second part 118 operably connects with and electromagnetically operates with the first part 116 to be driven by the signals and electrical power. The driven second part 118 enables the elevator cars 114 to move along the first part 116 and thus move within a lane 113, 115, and 117.

Those of skill in the art will appreciate that the first part 116 and second part 118 are not limited to this example. In alternative embodiments, the first part 116 may be configured as permanent magnets, and the second part 118 may be configured as windings or coils. Further, those of skill in the art will appreciate that other types of propulsion may be used without departing from the scope of the present disclosure.

The first part 116 is formed from a plurality of motor segments 122 (seen in FIG. 2), with each segment associated with a drive unit 120. Although not shown, the central lane 115 of FIG. 1 also includes a drive unit for each segment of the first part 116 that is within the lane 115. Those of skill in the art will appreciate that although a drive unit 120 is provided for each motor segment 122 (seen in FIG. 2) of the system (one-to-one) other configurations may be used without departing from the scope of the present disclosure. Further, those of skill in the art will appreciate that other types of propulsion may be employed without departing from the scope of the present disclosure. For example, a magnetic screw may be used for a propulsion system of elevator cars. Those of skill in the art will also appreciate that the embodiments disclosed herein may also be applied to roped elevator systems and hydraulically operated elevator systems. Thus, the described and shown propulsion system of this disclosure is merely provided for explanatory purposes, and is not intended to be limiting.

Figure 2:
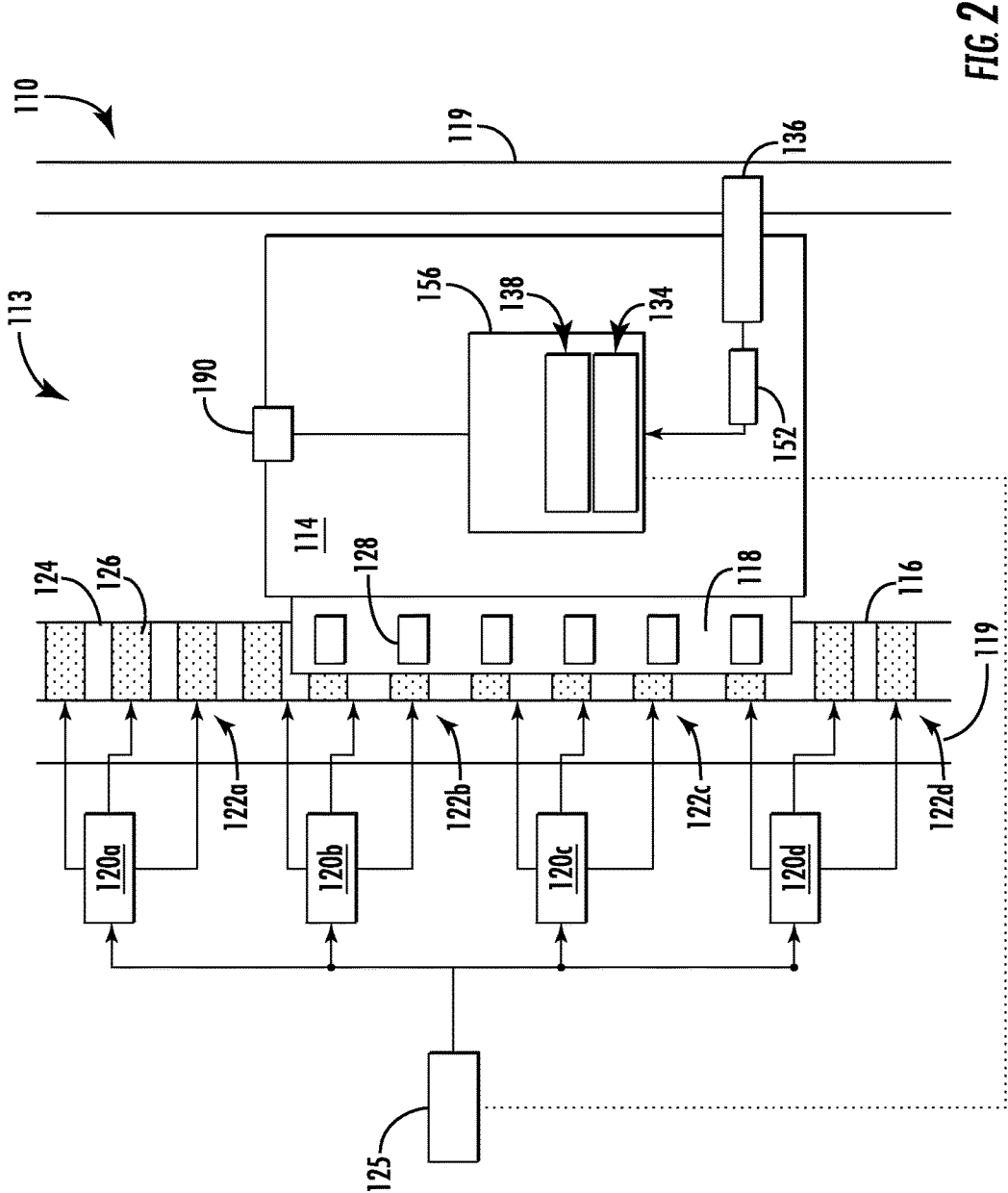
FIG. 2 illustrates an enlarged schematic view of a single elevator car within the multicar elevator system of FIG. 1, in accordance with an embodiment of the disclosure.

Turning now to FIG. 2, a view of an elevator system 110 including an elevator car 114 that travels in lane 113 is shown. Elevator car 114 is guided by one or more guide rails 124 extending along the length of lane 113, where the guide rails 124 may be affixed to a structural member 119. For ease of illustration, the view of FIG. 2 only depicts a single guide rail 124; however, there may be any number of guide rails positioned within the lane 113 and may, for example, be positioned on opposite sides of the elevator car 114. Elevator system 110 employs a linear propulsion system as described above, where a first part 116 includes multiple motor segments 122a, 122b, 122c, 122d each with one or more coils 126 (i.e., phase windings). The first part 116 may be mounted to guide rail 124, incorporated into the guide rail 124, or may be located apart from guide rail 124 on structural member 119. The first part 116 serves as a stator of a permanent magnet synchronous linear motor to impart force to elevator car 114. The second part 118, as shown in FIG. 2, is mounted to the elevator car 114 and includes an array of one or more permanent magnets 128 to form a second portion of the linear propulsion system of the ropeless elevator system. Coils 126 of motor segments 122a, 122b, 122c, 122d may be arranged in one or more phases, as is known in the electric motor art, e.g., three, six, etc. One or more first parts 116 may be mounted in the lane 113, to co-act with permanent magnets 128 mounted to elevator car 114. Although only a single side of elevator car 114 is shown with permanent magnets 128 the example of FIG. 2, the permanent magnets 128 may be positioned on two or more sides of elevator car 114. Alternate embodiments may use a single first part 116/second part 118 configuration, or multiple first part 116/second part 118 configurations.

In the example of FIG. 2, there are four motor segments 122a, 122b, 122c, 122d depicted. Each of the motor segments 122a, 122b, 122c, 122d has a corresponding or associated drive 120a, 120b, 120c, 120d. A system controller 125 provides drive signals to the motor segments 122a, 122b, 122c, 122d via drives 120a, 120b, 120c, 120d to control motion of the elevator car 114. The system controller 125 may be implemented using a microprocessor executing a computer program stored on a storage medium to perform the operations described herein. Alternatively, the system controller 125 may be implemented in hardware (e.g., field programmable gate array (FPGA), application specific integrated circuits (ASIC),) or in a combination of hardware/software. The system controller 125 may include power circuitry (e.g., an inverter or drive) to power the first part 116. Although a single system controller 125 is depicted, it will be understood by those of ordinary skill in the art that a plurality of system controllers may be used. For example, a single system controller may be provided to control the operation of a group of motor segments over a relatively short distance, and in some embodiments a single system controller may be provided for each drive unit or group of drive units, with the system controllers in communication with each other. In an embodiment, the system controller 125 controls the simultaneous operation of multiple elevator cars 114.

In some embodiments, as shown in FIG. 2, the elevator car 114 includes an on-board controller 156 with one or more transceivers 138 and a processor, or CPU, 134. The on-board controller 156 and the system controller 125 collectively form a control system where computational processing may be shifted between the on-board controller 156 and the system controller 125.

The on-board controller 156 and the system controller 125 may each include at least one processor and at least one associated memory comprising computer-executable instructions that, when executed by the processor, cause the processor to perform various operations. The processor may be but is not limited to a single-processor or multi-processor system of any of a wide array of possible architectures, including FPGA, central processing unit (CPU), ASIC, digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

In some embodiments, the processor 134 of on-board controller 156 is configured to monitor one or more sensors (ex: occupancy detection system 190 discussed further below) and to communicate with one or more system controllers 125 via the transceivers 138. In some embodiments, to ensure reliable communication, elevator car 114 may include at least two transceivers 138 configured for redundancy of communication. The transceivers 138 can be set to operate at different frequencies, or communication channels, to minimize interference and to provide full duplex communication between the elevator car 114 and the one or more system controllers 125. In the example of FIG. 2, the on-board controller 156 interfaces with a load sensor 152 to detect an elevator load on a brake 136. The brake 136 may engage with the structural member 119, a guide rail 124, or other structure in the lane 113. Although the example of FIG. 2 depicts only a single load sensor 152 and brake 136, elevator car 114 can include multiple load sensors 152 and brakes 136.

In an embodiment, the elevator car 114 may include an occupancy detection system 190 in operable communication with the on-board controller 156. The occupancy detection system 190 is configured to detect the occupancy status of the elevator car 114. The occupancy status may be at least one of occupied or unoccupied. In an embodiment, the occupancy status may be continually update through the movement of the elevator car 114. Occupied may mean that there are passengers in the elevator car 23 and/or particular objects that require safe handling. An object that requires safe handling may be an object such as, for example, an object on wheels that may move in the elevator or an object with a high center of gravity that may tip over in the elevator. In an alternate embodiment, the occupancy status may be fine-tuned further to differentiate between different types of passengers, such as, for example younger thrill seekers who might enjoy a faster elevator ride as opposed to someone using a walking cane who might require a gentler elevator ride. Unoccupied may mean that the elevator car 114 is free of passengers and/or objects that require safe handling.

The occupancy detection system 190 may use a variety of ranging sensors and/or presence detection devices such as, for example, a visual detection device, a weight detection device, a laser detection device, a thermal image detection device, a depth detection device, a motion detection device, an odor detection device, RADAR, ultrasonic sensor, and pyroelectric sensors. The visual detection device may be a camera that utilizes visual recognition to identify individual passengers and/or objects in the elevator car 114. The weight detection device may be a scale to sense the amount of weight in an elevator car 114 and then determine if passengers and/or objects are present from the weight sensed. The laser detection device may detect how many passengers walk through a laser beam to determine if there are passengers present in the elevator car 114. The thermal detection device may be an infrared or other heat sensing camera that utilizes detected temperature to identify individual passengers and objects in the elevator car 114. The depth detection device may be a 2-D, 3-D, ranging or other depth/distance detecting sensor that utilizes the detected distance to an object and/or passenger to determine if anything is present in an elevator car 114. One example of a depth detection device is LIDAR (Light Detection and Ranging). The motion detection device may be a motion detection sensor to detect motion in the elevator car 114 and determine if a passenger is present in the elevator car 114. The odor detection device may be an odor detector configured to determine if a passenger and/or object is present in the elevator car 114 such as, for example an electronic nose. As may be appreciated by one of skill in the art, in addition to the stated methods, additional methods may exist to detect passengers and one or any combination of these methods may be used to determine whether there are passengers and/or object in the elevator car 114.

Advantageously by being able to detect whether there are passengers in the elevator car 114, a motion profile of the elevator car 114 may be adjusted. The elevator car 114 moves according to the motion profile dictated by the system controller 125. The motion profile will place limits on motion parameters of the elevator car 114 to ensure passenger comfort. Motion parameters may include but are not limited to speed, acceleration, and jerk of the elevator car 114. Any further derivatives of the position of the elevator car 114 may also be included in the motion parameters. The system controller 125 may adjust the motion profile depending on the direction of travel of the elevator car 114. For instance, the motion profile may include motion parameters with a smaller magnitude when traveling laterally with passengers due to decreased passenger stability in the lateral direction as seen by arrow 188. For example, the elevator car 114 will accelerate and decelerate slower when operating in the lateral occupied motion profile in comparison to the occupied motion profile due to the decreased passenger stability in the lateral direction 188. Thus, the limits on speed, acceleration and jerk may be decreased when traveling in the lateral direction.

The system controller 125 also may adjust the motion profile based on whether there are passengers within the elevator car 114 and thus there may be an occupied motion profile and an unoccupied motion profile. The occupied motion profile may be used when there are passengers in the elevator car 114 and the unoccupied motion profile may be used when there are no passengers in the elevator car 114. The unoccupied motion profile may include motion parameters with a higher magnitude than the occupied motion profile. Advantageously, the unoccupied motion profile allows the elevator car 114 travel through the route faster. For example, the elevator car 114 is able to accelerate and decelerate faster operating in the unoccupied motion profile than the occupied motion profile. The unoccupied motion profile may also allow more jerk in the elevator car 114 than would typically be allowed with passengers. In another embodiment, there may be a power-save motion profile configured to help the elevator system save power when there is no demand for the elevator car. In the power-save motion profile the elevator car may operate with a motion parameter having a smaller magnitude than a comparable motion parameter of the occupied motion profile. For instance, operating the elevator car 114 at a lower speed allows the elevator system 100 to save power. Further there may also be an occupied descent motion profile that may operate with motioning parameters having a smaller magnitude than comparable motion parameters of the occupied motion profile. The occupied descent motion profile may be used when the elevator car 114 is determined to be occupied and traveling in the downward direction, as shown by arrow 182. For example, the occupied descent motion profile may help slow the velocity of the elevator car 114 so that it does not descend too fast.

Figure 3:
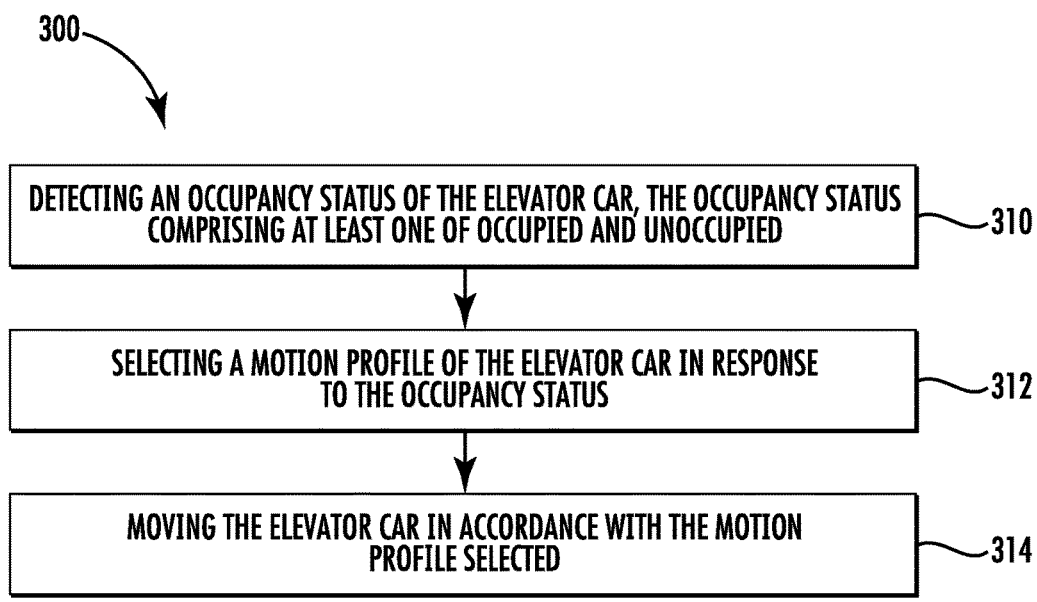
FIG. 3 is a flow diagram illustrating a method of operating the multi-car elevator system of FIGS. 1 and 2, according to an embodiment of the present disclosure.

Turning now to FIG. 3 while continuing to reference FIGS. 1-2, FIG. 3 shows a flow diagram illustrating a method 300 of operating the elevator system 100 of FIGS. 1 and 2, according to an embodiment of the present disclosure. At block 310, an occupancy status of an elevator car 114 is detected. As mentioned above, the occupancy status comprises at least one of occupied and unoccupied. In an embodiment, the elevator system 100 detects that the occupancy status using at least one of a visual detection device, a weight detection device, a laser detection device, a thermal image detection device, a depth detection device, a motion detection device, an odor detection device, a RADAR device, an ultrasonic sensor, and a pyroelectric sensor. In another embodiment, the occupancy status is continuously detected and updated throughout the movement of the elevator car 114.

At block 312, a motion profile of the elevator car 114 is selected in response to the occupancy status. As mentioned above, the motion profile comprises at least one of an unoccupied motion profile, an occupied motion profile, an occupied lateral movement motion profile, a power-save motion profile, and an occupied descent motion profile.

In an embodiment, the unoccupied motion profile allows the elevator car 114 to operate using a motion parameter having a greater magnitude than a comparable motion parameter of the occupied motion profile when the occupancy status detected is occupied. For instance, a speed is comparable to another speed, an acceleration is comparable to another acceleration, a jerk is comparable to another jerk, and so on and so forth. In one example, the elevator car 114 is able to accelerate and decelerate faster operating in the unoccupied motion profile than the occupied motion profile. In another example, the elevator car 114 will accelerate and decelerate slower when operating in the occupied motion profile in comparison to the unoccupied motion profile to ensure passenger comfort. As described above, the motion profile places limits on motion parameters of the elevator car 114 to ensure passenger comfort. Motion parameters may include but are not limited to speed, acceleration, and jerk of the elevator car 114. Any further derivatives of the position of the elevator car 114 may also be included in the motion parameters.

In an embodiment, the occupied lateral movement motion profile allows the elevator car 114 to operate using a motion parameter having a smaller magnitude than a comparable motion parameter of the occupied motion profile when the occupancy status detected is occupied and the direction of travel includes a lateral motion. For example, the elevator car 114 will accelerate and decelerate slower when operating in the lateral occupied motion profile in comparison to the occupied motion profile due to decreased passenger stability in the lateral direction 188.

In an embodiment, the occupied descent motion profile allows the elevator car 114 to operate using a motion parameter having a smaller magnitude than a comparable motion parameter of the occupied motion profile when the occupancy status detected is occupied and the direction of travel includes a downward motion. For example, the elevator car 114 may reduce its velocity when descending with passengers. In an embodiment, the power-save motion profile allows the elevator car 114 to operate using a motion parameter having a smaller magnitude than a comparable motion parameter of the occupied motion profile when the occupancy status detected is unoccupied. For example, the elevator car 114 may move at a slower velocity when unoccupied in order to save power.

As mentioned above, the system controller 125 also may adjust the motion profile based on whether there are passengers within the elevator car 114. The occupied motion profile may be used when there are passengers in the elevator car 114 and the unoccupied motion profile may be used when there are no passengers in the elevator car 114. Advantageously, the unoccupied motion profile allows the elevator car 114 to travel through the route segment faster. For instance, the elevator car 114 may be allowed to accelerate faster than would typically be allowed with passengers. The unoccupied motion profile may also allow more jerk in the elevator car 114 than would typically be allowed with passengers.

At block 314, the elevator car 114 is moved in accordance with the motion profile selected. In an embodiment, the elevator car is moved along a route. The route is composed of at least one route segment. For example, a route segment may be that the elevator car 114 moves from a first floor to a second floor. The route may be determined prior to moving the elevator car 114. In an embodiment, the route is determined by the system controller 125 and the route execution is monitored by the on-board controller 156 to ensure that the route is carried out. In another embodiment, the route is determined for the elevator car 114 after receiving an elevator call from a floor 140 and the route includes a stop for the elevator car at the floor 140. In another embodiment, the route is determined for the elevator car 114 after receiving destination floor car call, such as, for example a passenger within the elevator car 114 pressing a button to select a destination floor. An elevator call may be a passenger pressing an elevator call button on the floor 140 requesting the elevator car 114 come to the floor 140 to pick up the passenger.

While the above description has described the flow process of FIG. 3 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an elevator system, the method comprising:
   detecting an occupancy status of the elevator car, the occupancy status comprising at least one of occupied and unoccupied;
   selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and moving the elevator car in accordance with the motion profile selected.

2. The method of claim 1, wherein:
the unoccupied motion profile allows the elevator car to operate using a motion parameter having a greater magnitude than a comparable motion parameter of the occupied motion profile.

3. The method of claim 1, further comprising:
detecting a direction of travel of an elevator car;
wherein the occupied lateral movement motion profile allows the elevator car to operate using a motion parameter having a smaller magnitude than a comparable motion parameter of the occupied motion profile.

4. The method of claim 1, further comprising:
detecting a direction of travel of an elevator car;
wherein the occupied descent motion profile allows the elevator car to operate using a motion parameter having a smaller magnitude than a comparable motion parameter of the occupied motion profile.

5. The method of claim 1, wherein:
the power-save motion profile allows the elevator car to operate using a motion parameter having a smaller magnitude than a comparable motion parameter of the occupied motion profile.

6. The method of claim 1, wherein:
the motion parameters include at least one of a speed of the elevator car, an acceleration of the elevator car, and a jerk of the elevator car.

7. The method of claim 1, wherein:
the elevator system is a ropeless multi-car elevator system.

8. The method of claim 1, wherein:
the elevator system detects that the occupancy status using at least one of a visual detection device, a weight detection device, a laser detection device, a thermal image detection device, a depth detection device, a motion detection device, an odor detection device, a RADAR device, an ultrasonic sensor, and a pyroelectric sensors.

9. The method of claim 1, wherein
the occupancy status is continuously detected and updated throughout the movement of the elevator car.

10. An elevator system comprising:
a processor;
a memory comprising computer-executable instructions that, when executed by the processor, cause the processor to perform operations, the operations comprising:
    detecting an occupancy status of the elevator car, the occupancy status comprising at least one of occupied and unoccupied;
    selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and
    moving the elevator car in accordance with the motion profile selected.

11. The elevator system of claim 10, wherein:
the unoccupied motion profile allows the elevator car to operate using a motion parameter having a greater magnitude than a comparable motion parameter of the occupied motion profile.

12. The elevator system of claim 10, wherein the operations further comprise:
detecting a direction of travel of an elevator car;
wherein the occupied lateral movement motion profile allows the elevator car to operate using a motion parameter having a smaller magnitude than a comparable motion parameter of the occupied motion profile.

13. The elevator system of claim 10, wherein the operations further comprise:
detecting a direction of travel of an elevator car;
wherein the occupied descent motion profile allows the elevator car to operate using a motion parameter having a smaller magnitude than a comparable motion parameter of the occupied motion profile.

14. The elevator system of claim 10, wherein:
the power-save motion profile allows the elevator car to operate using a motion parameter having a smaller magnitude than a comparable motion parameter of the occupied motion profile.

15. The elevator system of claim 10, wherein:
the motion parameters include at least one of a speed of the elevator car, an acceleration of the elevator car, and a jerk of the elevator car.

16. The elevator system of claim 10, wherein:
the elevator system is a ropeless multi-car elevator system.

17. The elevator system of claim 10, wherein:
the elevator system detects that the occupancy status using at least one of a visual detection device, a weight detection device, a laser detection device, a thermal image detection device, a depth detection device, a motion detection device, an odor detection device, a RADAR device, an ultrasonic sensor, and a pyroelectric sensors.

18. The elevator system of claim 10, wherein
the occupancy status is continuously detected and updated throughout the movement of the elevator car.

19. A computer program product tangibly embodied on a computer readable medium,
the computer program product including instructions that, when executed by a processor, cause the processor to perform operations comprising:
    detecting an occupancy status of the elevator car, the occupancy status comprising at least one of occupied and unoccupied;
    selecting a motion profile of the elevator car in response to the occupancy status, the motion profile comprising at least one of an unoccupied motion profile, an occupied motion profile, an occupied lateral movement motion profile, a power-save motion profile, and an occupied descent motion profile; and
    moving the elevator car in accordance with the motion profile selected.

20. The computer program of claim 19, wherein:
the unoccupied motion profile allows the elevator car to operate using a motion parameter having a greater magnitude than a comparable motion parameter of the occupied motion profile.

* * * * *